(12) United States Patent
Chang et al.

(10) Patent No.: US 12,043,219 B2
(45) Date of Patent: Jul. 23, 2024

(54) SEALED TYPE WINDSHIELD WIPER STRUCTURE

(71) Applicant: DANYANG UPC AUTO PARTS CO., LTD., Jiangsu (CN)

(72) Inventors: Che-Wei Chang, Jiangsu (CN); Cheng-Kai Yang, Jiangsu (CN); Chuan-Chih Chang, Jiangsu (CN)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 18/215,070

(22) Filed: Jun. 27, 2023

(65) Prior Publication Data

US 2023/0339433 A1    Oct. 26, 2023

Related U.S. Application Data

(63) Continuation of application No. 17/727,287, filed on Apr. 22, 2022, now Pat. No. 11,766,996.

(51) Int. Cl.
*B60S 1/38* (2006.01)

(52) U.S. Cl.
CPC ............... *B60S 1/3881* (2013.01); *B60S 1/38* (2013.01); *B60S 1/381* (2013.01); *B60S 1/3848* (2013.01);
(Continued)

(58) Field of Classification Search
CPC ........ B60S 1/38; B60S 1/3848; B60S 1/3881; B60S 1/3875; B60S 1/3874; B60S 1/3882;
(Continued)

(56) References Cited

U.S. PATENT DOCUMENTS 3,619,556 A * 11/1971 Deibel .................. B60S 1/3805
15/250.07
3,707,384 A * 12/1972 Wise ........................ A23B 7/06
426/281
(Continued)

FOREIGN PATENT DOCUMENTS

EP    1972512 A2 *  9/2008  ................. B60S 1/38
EP    2103490 A1 *  9/2009  ............. B60S 1/381
(Continued)

OTHER PUBLICATIONS

Office Action dated Jan. 23, 2024 of the corresponding Japan patent application No. 2022-070065.

*Primary Examiner* — Gary K. Graham
(74) *Attorney, Agent, or Firm* — Chun-Ming Shih; HDLS IPR SERVICES (57) ABSTRACT

This disclosure provides a sealed type windshield wiper structure (1). The carrying seat (20) is combined on the hooking seat (10). The carrying seat (20) includes a carrying board (21) and a carrying frame (22). The carrying board (21) includes a through slot (210), and the carrying frame (22) includes an accommodating slot (220). The elastic piece (30) is inserted in the through slot (210). The waterproof cover (40) includes a shell (41), an inner space (32) and an outer space (43) The carrying seat (20) is inserted in the inner space (42). The rubber wiper (50) includes a piercing strip (51) and a scraping strip (52). The piercing strip (51) is inserted in the outer space (43), and the scraping strip (52) is exposed from the waterproof cover (40) to configure the sealed type windshield wiper structure (1).

5 Claims, 9 Drawing Sheets

(52) U.S. Cl.
CPC ........... *B60S 1/3858* (2013.01); *B60S 1/3874* (2013.01); *B60S 1/3875* (2013.01); *B60S 1/3882* (2013.01); *B60S 1/3887* (2013.01); *B60S 1/3894* (2013.01); *B60S 2001/3812* (2013.01)

(58) Field of Classification Search
CPC ........... B60S 1/3887; B60S 2001/3812; B60S 2001/3843; B60S 1/3858; B60S 1/381; B60S 1/3894
USPC ........... 15/250.43, 250.44, 250.361, 250.201
See application file for complete search history.

(56) References Cited

U.S. PATENT DOCUMENTS

| | | | | |
|---|---|---|---|---|
| 4,360,941 | A * | 11/1982 | Mabie | B60S 1/3805 15/250.07 |
| 7,461,429 | B2 * | 12/2008 | Huang | B60S 1/3806 15/250.43 |
| 9,896,065 | B2 * | 2/2018 | Caillot | B60S 1/3881 |
| 11,766,996 | B1 * | 9/2023 | Chang | B60S 1/3882 15/250.32 |

FOREIGN PATENT DOCUMENTS

| | | |
|---|---|---|
| JP | H0544726 U | 6/1993 |
| JP | 2010163132 A | 7/2010 |
| JP | 2012148616 A | 8/2012 |
| JP | 2016028949 A | 3/2016 |
| JP | 2017222341 A | 12/2017 |

\* cited by examiner

SEALED TYPE WINDSHIELD WIPER STRUCTURE

CROSS-REFERENCE TO RELATED APPLICATION

This application is a continuing application of U.S. patent application Ser. No. 17/727,287, filed on Apr. 22, 2022, and entitled "SEALED TYPE WINDSHIELD WIPER STRUCTURE". The entire disclosures of the above application are all incorporated herein by reference.

BACKGROUND

Technical Field

The technical field relates to a windshield wiper, and more particularly relates to a waterproof windshield wiper.

Description of Related Art

Automotive windshield wiper is assembled on an outer surface of a windshield. The windshield wiper is connected to a wiper driving arm, and the wiper driving arm drives the windshield wiper to swing on the windshield for scraping objects such as rainwater or stain.

Moreover, a windshield wiper structure mainly includes a hooking seat, a metal elastic sheet, a wiper cover, and a wiper blade. The hooking seat is combined with the elastic sheet and the wiper blade, and then the wiper cover is installed on the top of the hooking seat and connected to the wiper driving arm. Therefore, the wiper blade is driven to move through the wiper driving arm to clean the motor vehicle window.

However, since the combination structure of the wiper cover and the metal elastic sheet of the windshield wiper structure is not airtight, rainwater may easily penetrate into the wiper cover and infiltrate the metal elastic sheet. As a result, the metal elastic sheet may be corroded easily and the service life is shortened. Particularly, when the windshield wiper is used in an icy environment, the metal elastic sheet may lose its original elastic force due to freezing. Therefore, a further improvement is required.

SUMMARY OF THE DISCLOSURE

This disclosure is to provide a sealed type windshield wiper structure to keep the airtightness of the internal structure of the windshield wiper to maintain the elastic pressing force of the metal elastic sheet and increase the service life of the windshield wiper.

In order to achieve the object mentioned above, this disclosure provides a sealed type windshield wiper structure including a hooking seat, a carrying seat, an elastic piece, a waterproof cover, and a rubber wiper. The carrying seat is combined on a bottom side of the hooking seat. The carrying seat includes a carrying board and a carrying frame connected with the carrying board. The carrying board includes a through slot, and the carrying frame includes an accommodating slot. The elastic piece is inserted in the through slot and extended to two sides of the carrying seat. The waterproof cover includes a shell, an inner space defined in the shell, and an outer space defined outside the shell. The carrying seat is inserted in the inner space. The rubber wiper includes a piercing strip and a scraping strip connected to the piercing strip. The piercing strip is inserted in the outer space, and the scraping strip is exposed from the waterproof cover.

This disclosure is to provide a sealed type windshield wiper structure, in which the thickness of the top wall is greater than the thickness of any one of the two side walls. Therefore, the waterproof cover may maintain the desired strength and flexibility of the structure to have a well appearance without wrinkling.

This disclosure is to provide a sealed type windshield wiper structure, in which the end plugs are assembled on two ends of the waterproof cover to seal the waterproof cover, so that the elastic piece inserted inside the waterproof cover may be isolated from the external moisture.

In comparison with the related art, the sealed windshield wiper structure of this disclosure is provided with a waterproof cover. Additionally, the elastic piece passes through the carrying seat and is inserted in the inner space of the waterproof cover. Furthermore, the end plugs are assembled on two ends of the waterproof cover to seal the waterproof cover, so that the elastic piece may be isolated from the external moisture to achieve the purpose of waterproof and maintain the desired elastic force.

BRIEF DESCRIPTION OF DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
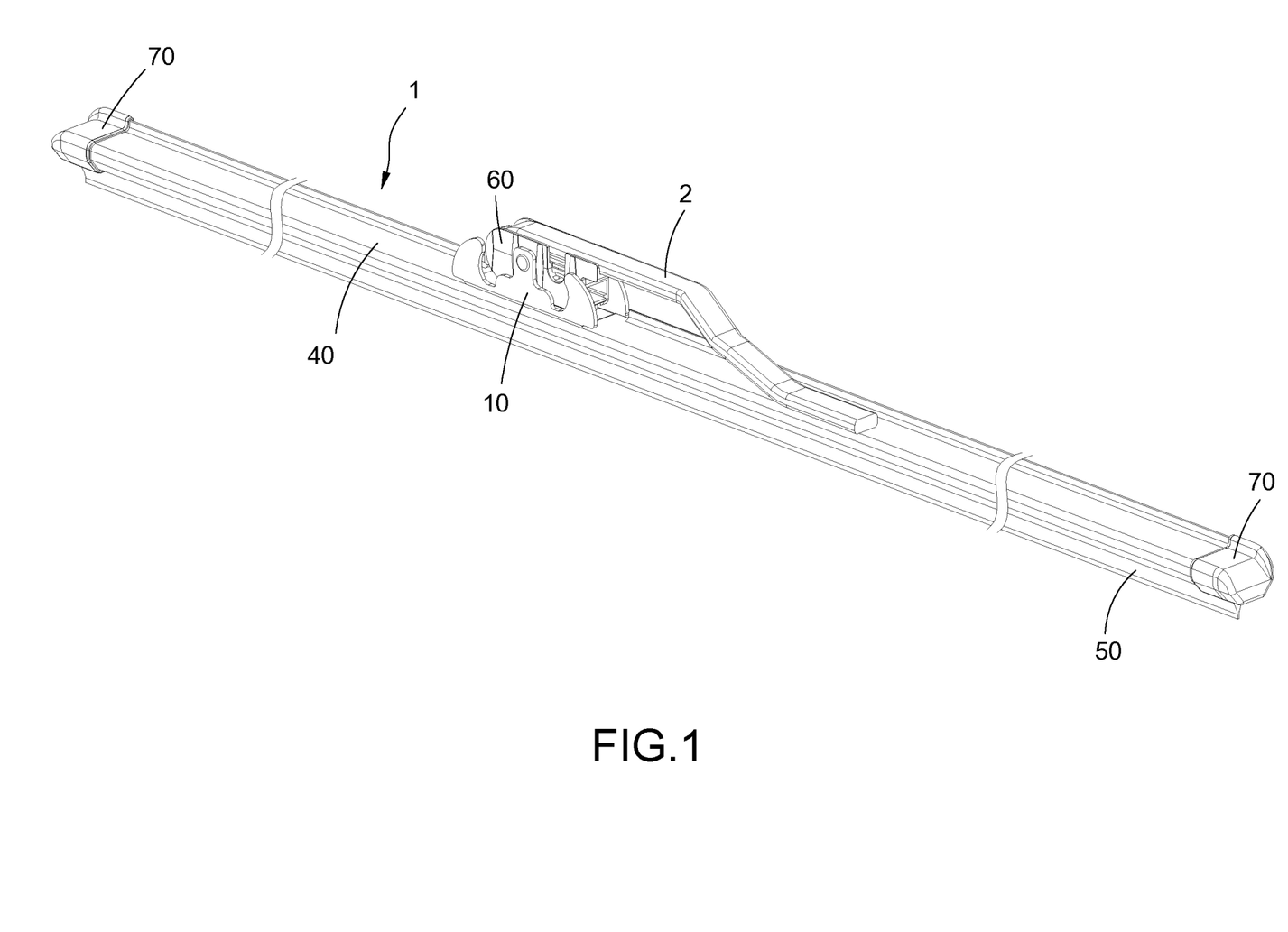
FIG. 1 is a perspective schematic view of the sealed type windshield wiper structure in this disclosure.
Figure 2:
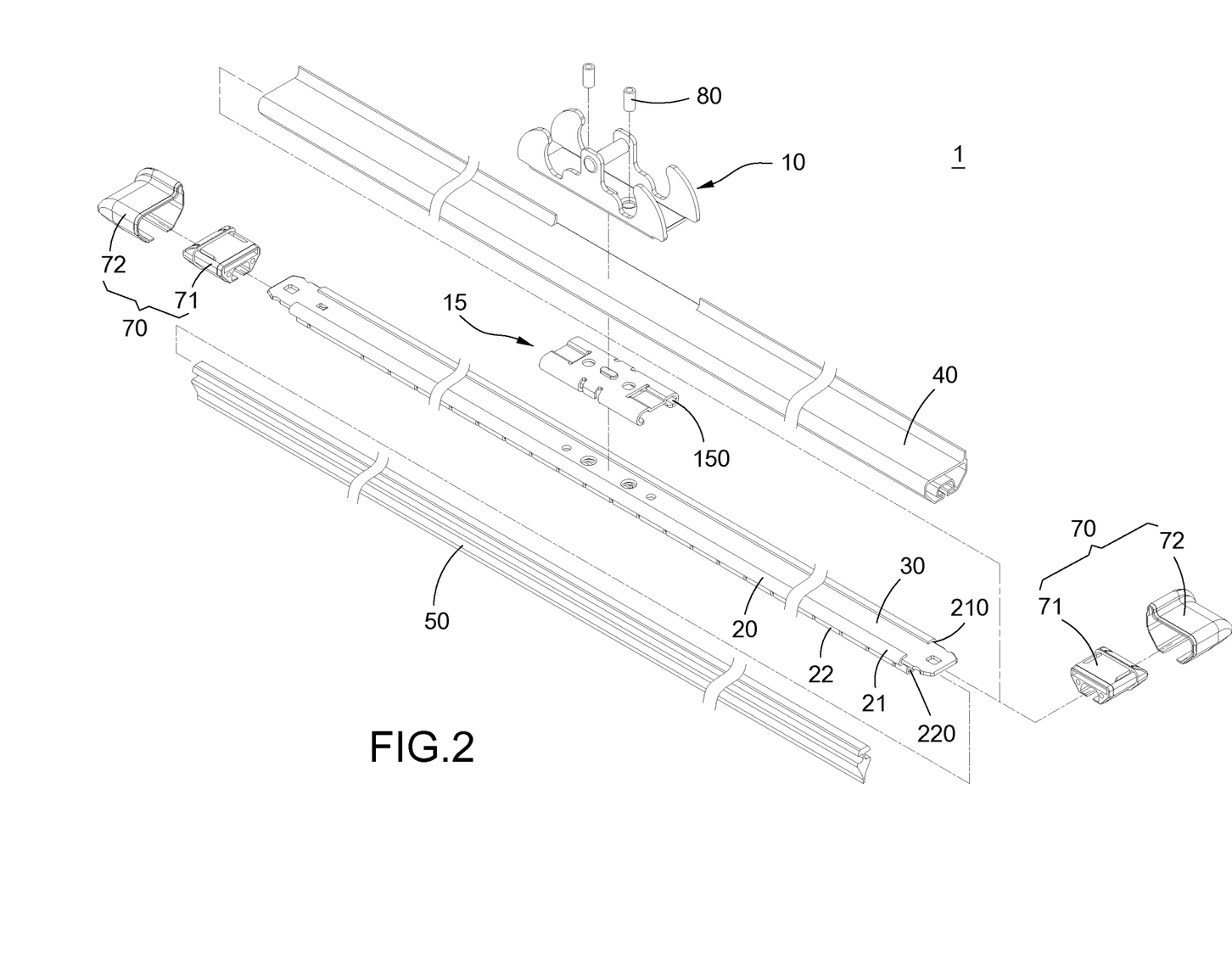
FIG. 2 is a perspective exploded view of the sealed type windshield wiper structure in this disclosure.

Please refer to FIG. 1 and FIG. 2, which respectively depict a perspective schematic view and a perspective exploded view of the sealed type windshield wiper structure in this disclosure. This disclosure provides a sealed type windshield wiper structure 1 for combining with a wiper driving arm 2. The sealed type windshield wiper structure 1 includes a hooking seat 10, a carrying seat 20, an elastic piece 30, a waterproof cover 40 and a rubber wiper 50. The carrying seat 20 is disposed on the bottom side of the hooking seat 10 and is combined with the elastic piece 30 and the waterproof cover 40. Additionally, one end of the rubber wiper 50 is inserted in the waterproof cover 40.

In one embodiment of this disclosure, the sealed type windshield wiper structure 1 further includes a holding seat 60. The holding seat 60 is combined on the hooking seat 10. The holding seat 60 covers the hooking seat 10 and supports one end of a wiper driving arm 2.

Specifically, the hooking seat 10 is used for combining with the wiper driving arm 2. Furthermore, the sealed type windshield wiper structure 1 further includes an engaging seat 15. The engaging seat 15 is combined on the bottom side of the hooking seat 10 and includes a pair of through holes 150.

The carrying seat 20 is combined on the bottom side of the hooking seat 10. The carrying seat 20 includes a carrying board 21 and a carrying frame 22 connected with the carrying board 21. Two sides of the carrying board 21 are respectively inserted in the pair of through holes 150 of the engaging seat 15, and the carrying board 21 includes a through slot 210. Moreover, the carrying frame 22 includes an accommodating slot 220. In this embodiment, the carrying frame 22 is structured by a plurality of claw hooks 221 arranged corresponding to each other.

Figure 3:
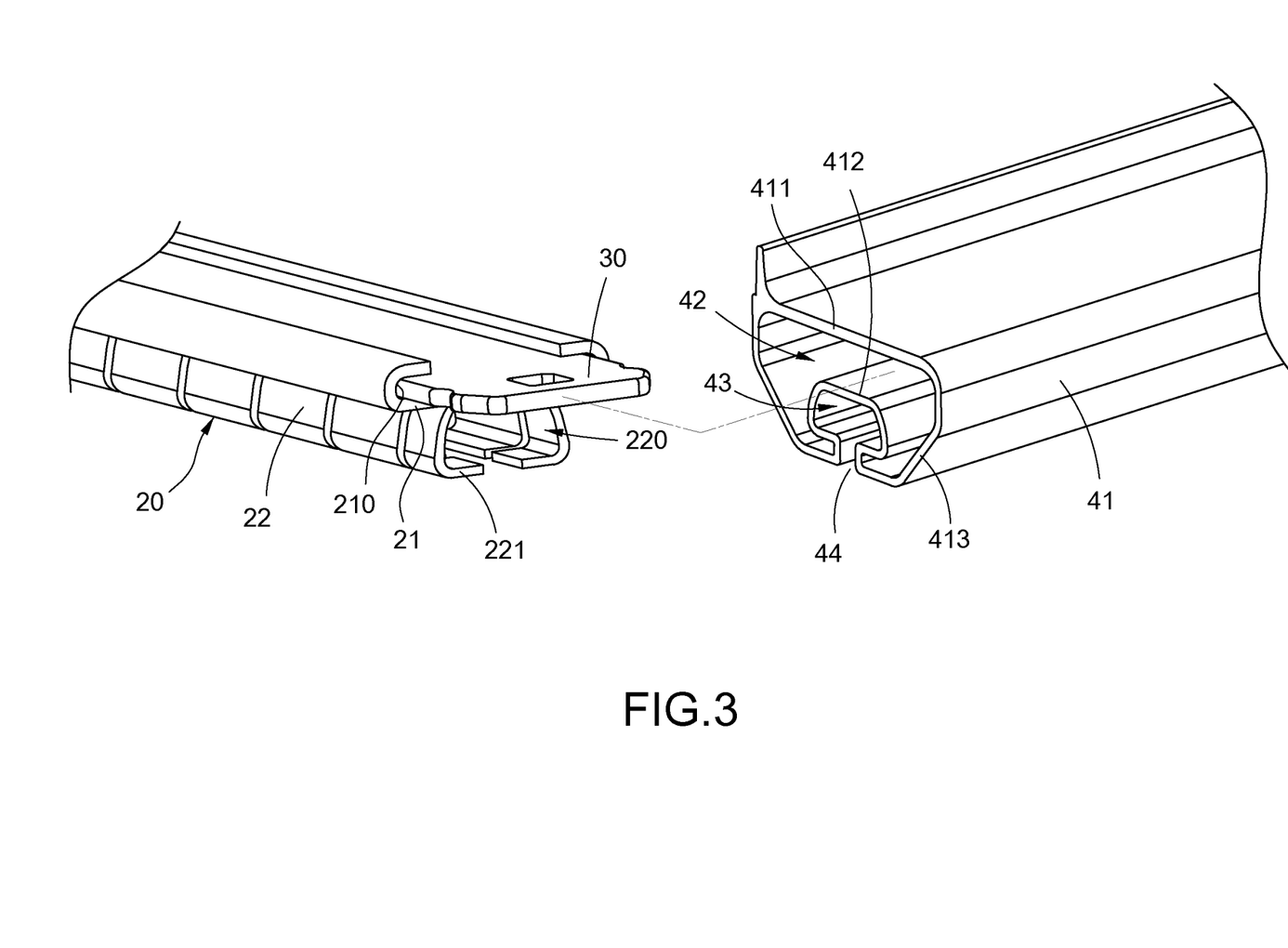
FIG. 3 is a schematic view of the combination of the carrying seat and the waterproof cover in this disclosure.
Figure 4:
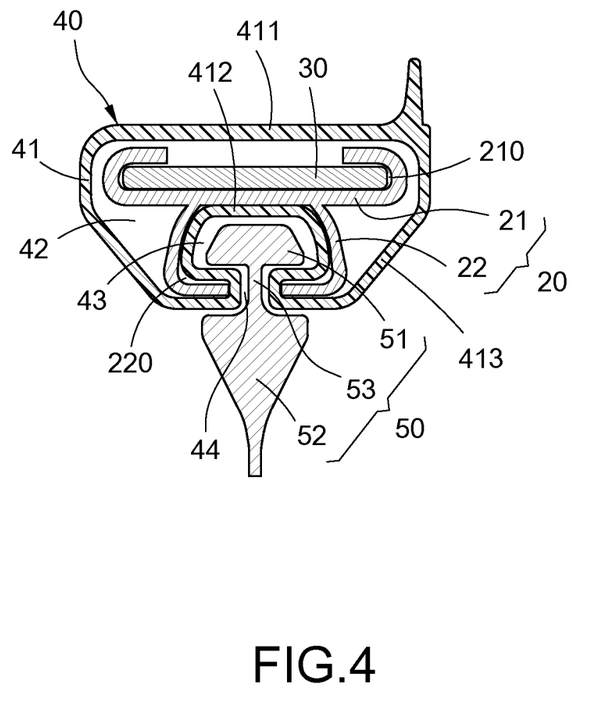
FIG. 4 is a cross-sectional view of the combination of the waterproof cover and the rubber wiper in this disclosure.
Figure 5:
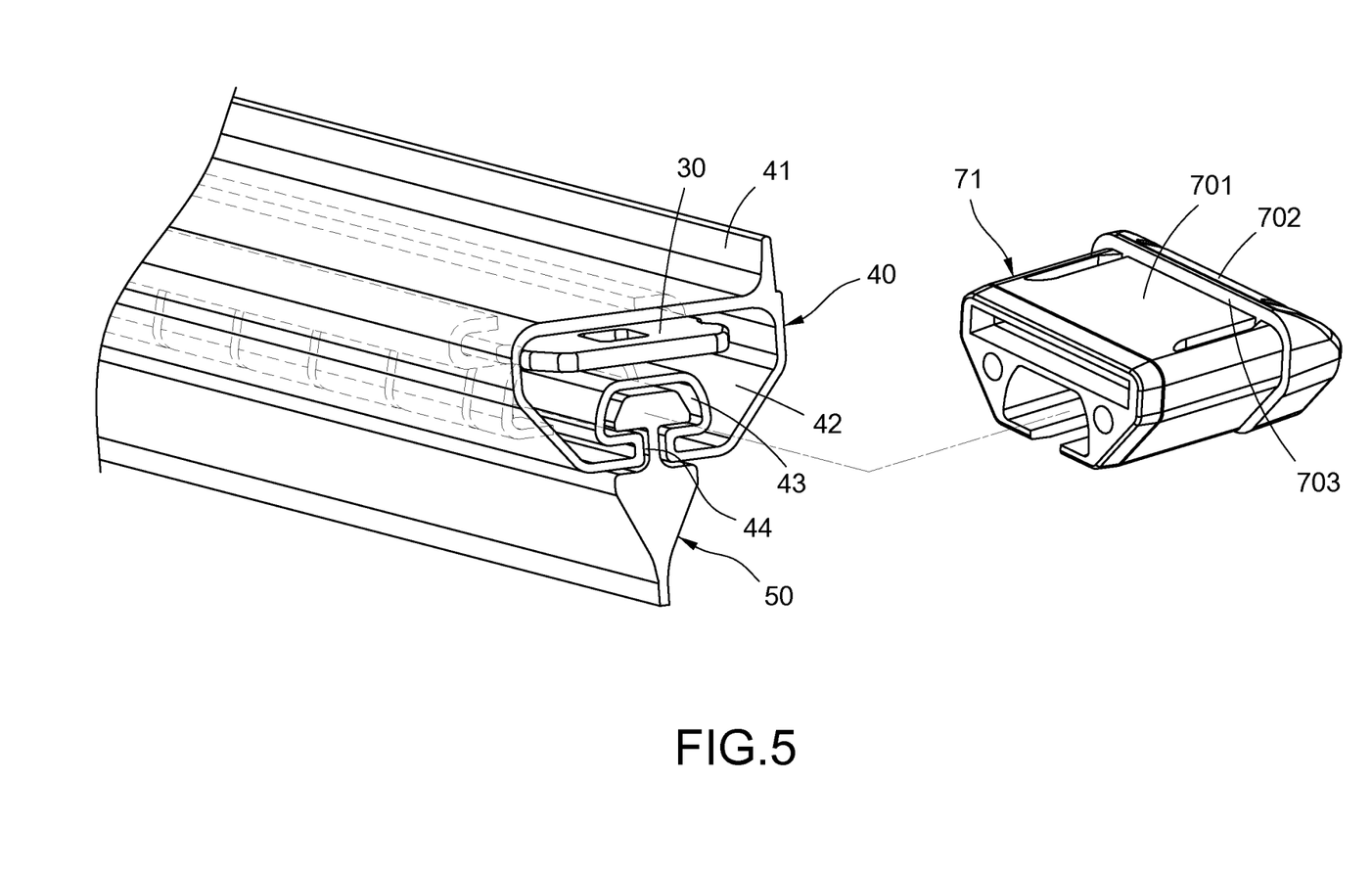
FIG. 5 is a schematic view of the sealed type windshield wiper structure combined with the end plugs.

Please refer to FIG. 3 and FIG. 4, which depict a schematic view of the combination of the carrying seat and the waterproof cover in this disclosure and a cross-sectional view of the combination of the waterproof cover and the rubber wiper in this disclosure. In this embodiment, the elastic piece 30 is inserted in the through slot 210 and extended to two sides of the carrying seat 20. In some embodiments, the elastic piece 30 may be a metal elastic sheet.

The waterproof cover 40 includes a shell 41, an inner space 42 disposed in the shell 41 and an outer space 43 formed outside the shell 41. The carrying seat 20 is inserted in the inner space 43. Specifically, the inner space 42 and the outer space 43 are respectively in a U-shaped configuration from the cross-sectional view, and one side of the outer space 43 is an opening 44.

In more detail, the shell 41 includes a top wall 411 attached to the hooking seat 10, an inner bottom wall 412 located opposite to the top wall 411 and attached to the carrying board 21, and two side walls 413 connected to the top wall 411 and the inner bottom wall 412. It is worth noting that in this embodiment, the thickness of the top wall 411 is greater than the thickness of any one of the two side walls 413. Therefore, the waterproof cover 40 may maintain the desired strength and flexibility of the structure to have a well appearance without wrinkling. In this embodiment, the thickness of the top wall 411 is about 0.5 mm to 1 mm, and the thickness of the side wall 413 is about 0.3 mm to 0.6 mm.

It should be noted that the waterproof cover 40 is made of thermoplastic vulcanization (TPV). The TPV is a kind of stable elastomer which is made by dynamically vulcanizing ethylene propylene diene monomer (EPDM) and polypropylene (PP) and has the characteristics of non-toxic for environmental protection, desired aging resistance, and minor change in hardness with respect to temperature. In addition, since TPV does not contain carcinogens such as nitrite or heavy metals and may be recycled, TPV reaches the sanitary level, passes the SGS certification and is complied with the EU ROHS standard. Furthermore, the operating temperature of TPV may reach −30° C. to 120° C. The change of Shore Hardness is not higher than 5A within the temperature range of −20° C. to 40° C., and that is better than traditional materials such as PVC and EPDM etc.

It should be noted that the waterproof cover 40 of this disclosure is manufactured by extrusion molding. Additionally, the length and the shape of the waterproof cover 40 are not limited. Thus, the waterproof cover 40 has advantages of high yield, low cost for mass production.

Furthermore, the rubber wiper 50 is combined in the waterproof cover 40. The rubber wiper 50 includes a piercing strip 51, a scraping strip 52 connected to the piercing strip 51, and a linking section 53 connected between the piercing strip 51 and the scraping strip 52. More specifically, the piercing strip 51 is inserted in the outer space 43. The scraping strip 52 is exposed from the waterproof cover 40. The linking section 53 is erected in the opening 44.

Please further refer to FIG. 5 to FIG. 8, which depict a schematic view of the sealed type windshield wiper structure combined with the end plugs, a schematic view of bonding the inner end plug in this disclosure, a schematic view of the combination of the outer end plug and the inner end plug in this disclosure and a cross-sectional view of the sealed type windshield wiper structure combined with the end plugs in this disclosure. The sealed type windshield wiper structure 1 of this disclosure further includes a pair of end plugs 70. The pair of end plugs 70 are assembled on two ends of the shell 41 to seal the inner space 42.

Specifically, each of the end plugs 70 includes an inner end plug 71 and an outer end plug 72. The inner end plug 71 is bonded on the shell 41, and the outer end plug 72 sheathes the inner end plug 71. Accordingly, the inner space 42 is formed into a closed space, so that the elastic piece 30 inserted in the inner space 42 is isolated from the external moisture to achieve the purpose of waterproofing.

Figure 6:
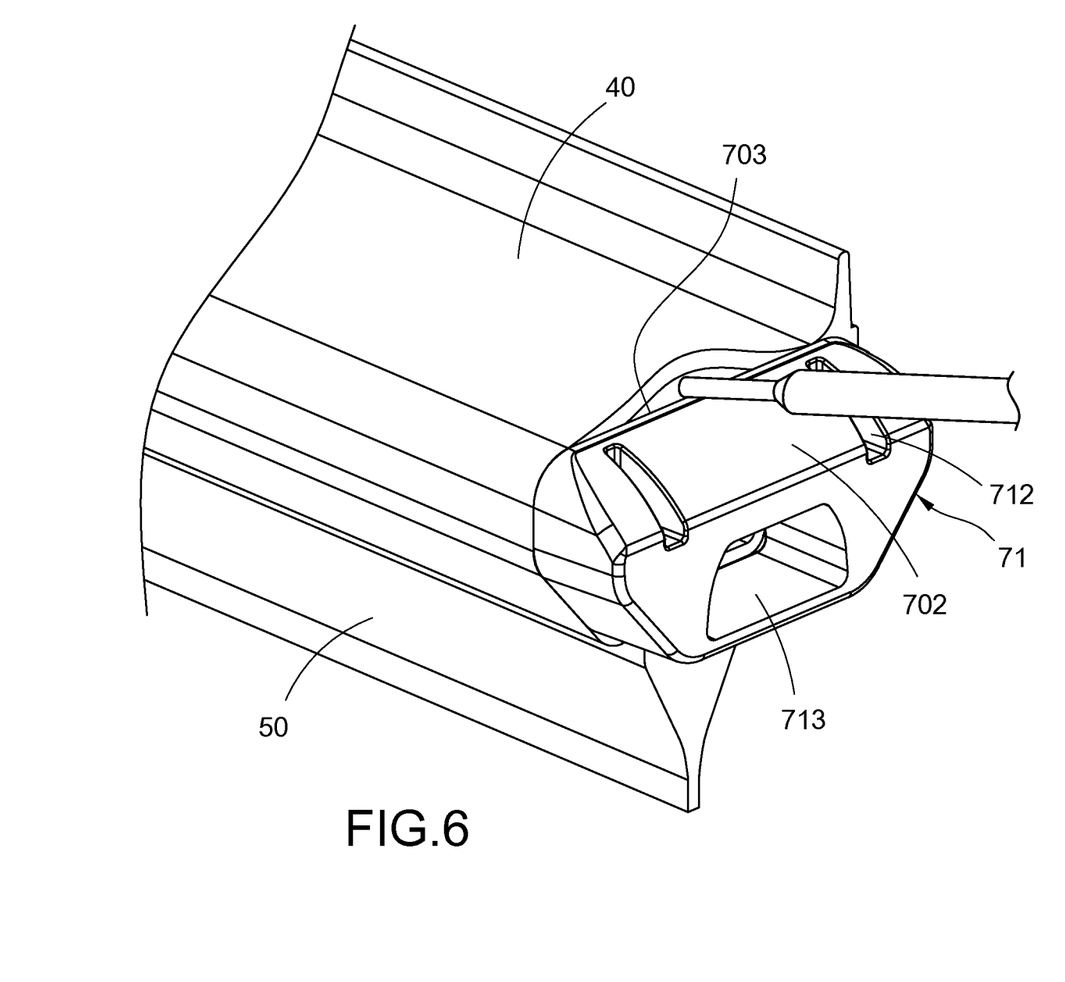
FIG. 6 is a schematic view of bonding the inner end plug in this disclosure.
Figure 8:
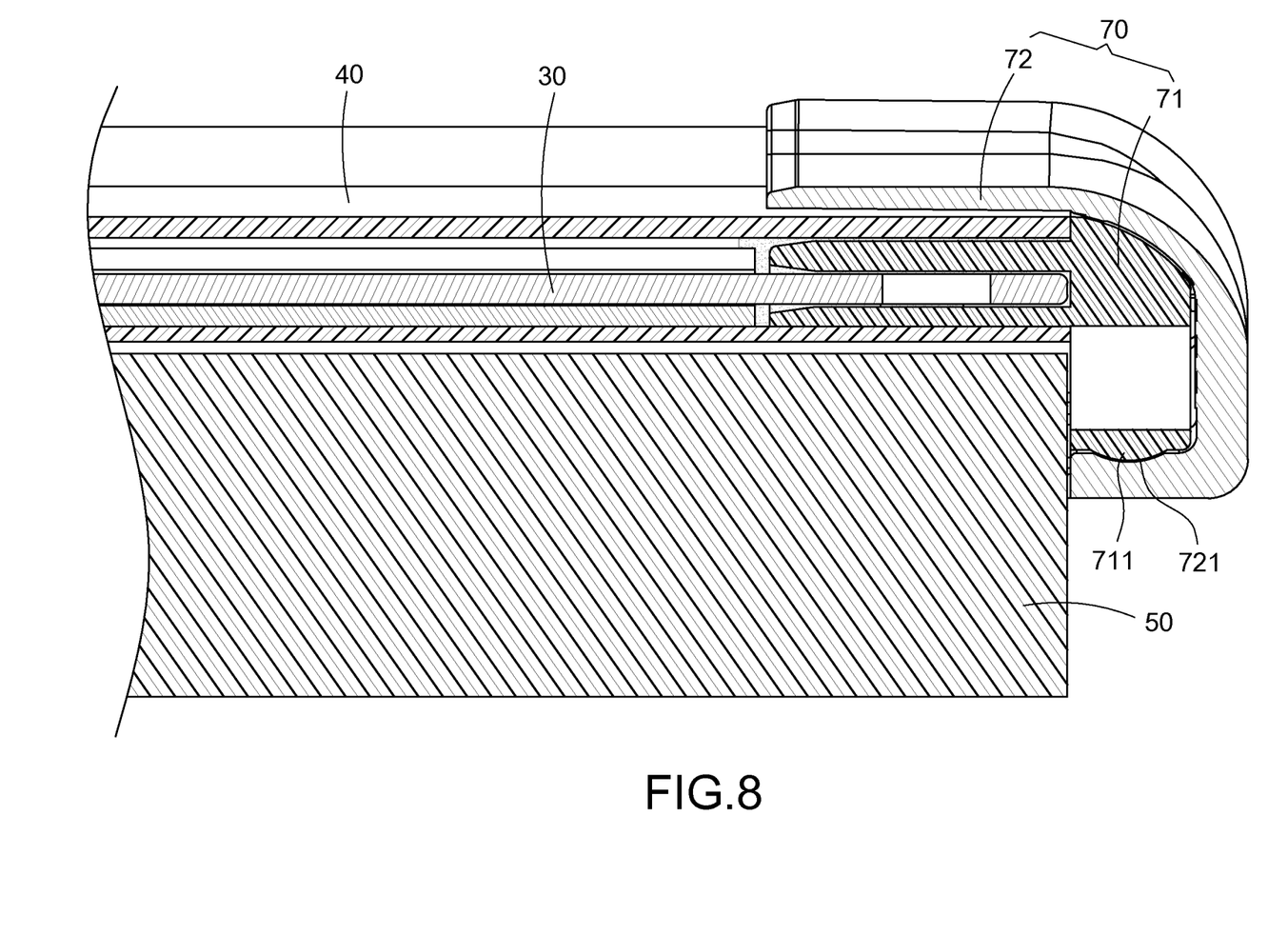
FIG. 8 is a cross-sectional view of the sealed type windshield wiper structure combined with the end plugs in this disclosure.

Moreover, the inner end plug 71 includes a glue section 701 inserted in the shell 41, a bonding section 702 protruded outside the shell 41 and a protrusion rib 703. The surface of the bonding section 702 is higher than that of the glue section 701, and the protrusion rib 703 is located between the bonding section 702 and the glue section 701, so as to prevent the glue from spilling during the operation of potting compound. Furthermore, the arrangement of the protrusion rib 703 may be used for positioning the inner end plug 71.

Figure 7:
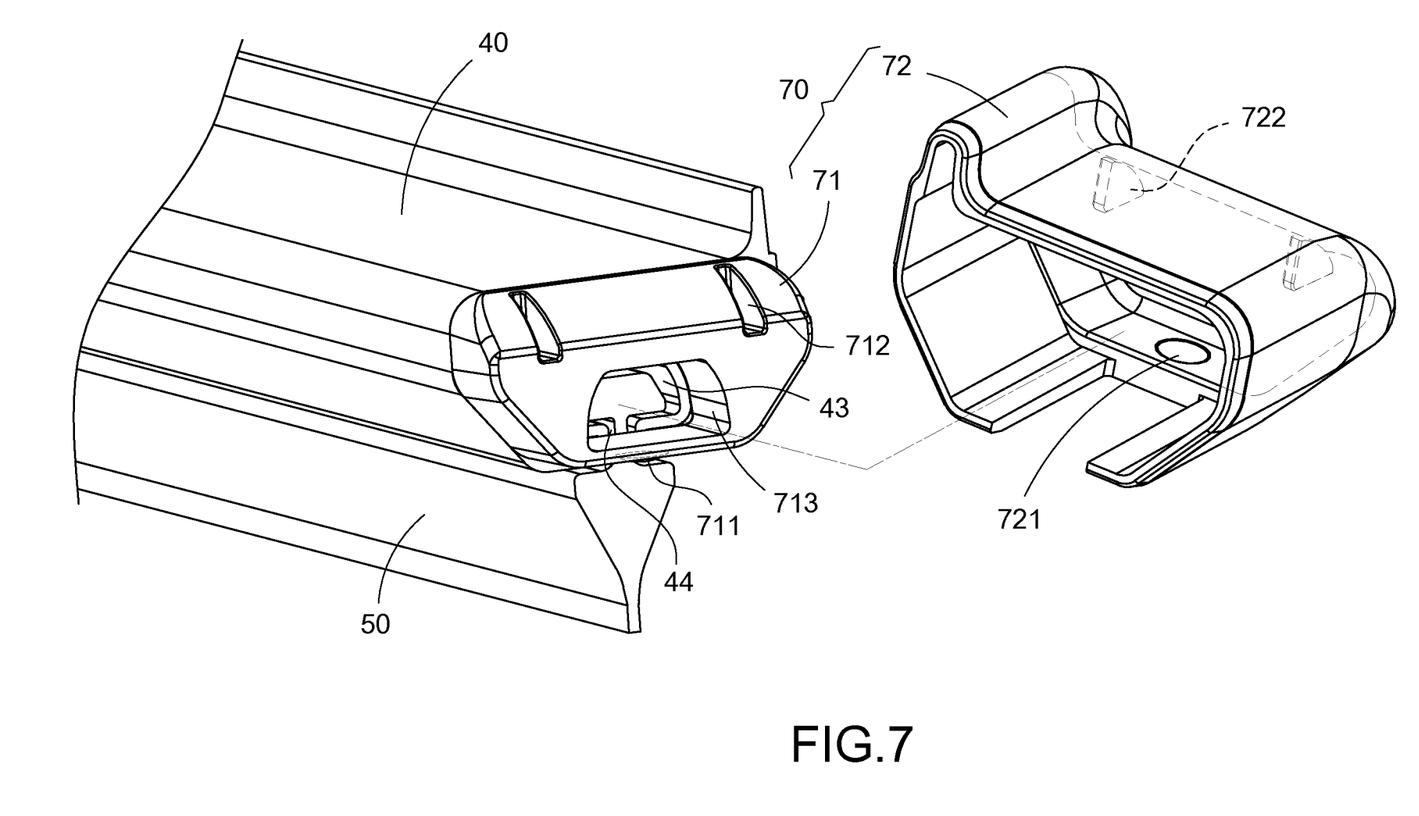
FIG. 7 is a schematic view of the combination of the outer end plug and the inner end plug in this disclosure.

As shown in FIG. 7, a convex portion 711 is disposed at the bottom of the inner end plug 71, and a concave portion 721 is correspondingly disposed at the bottom of the outer end plug 72. In this embodiment, the inner end plug 71 is provided with a plurality of positioning grooves 712. The outer end plug 72 is provided with a plurality of positioning ribs 722 corresponding to the positioning grooves 712. When the outer end plug 72 sheathes the inner end plug 71, the positioning ribs 722 and the positioning grooves 712 are mutually positioned to increase the accuracy of assembly.

It should be noted that the inner end plug 71 is further provided with a hole 713. The hole 713 is provided for potting compound into the outer space 43 and the opening 44 of the waterproof cover 40, so as to seal the side of the waterproof cover 40.

Figure 9:
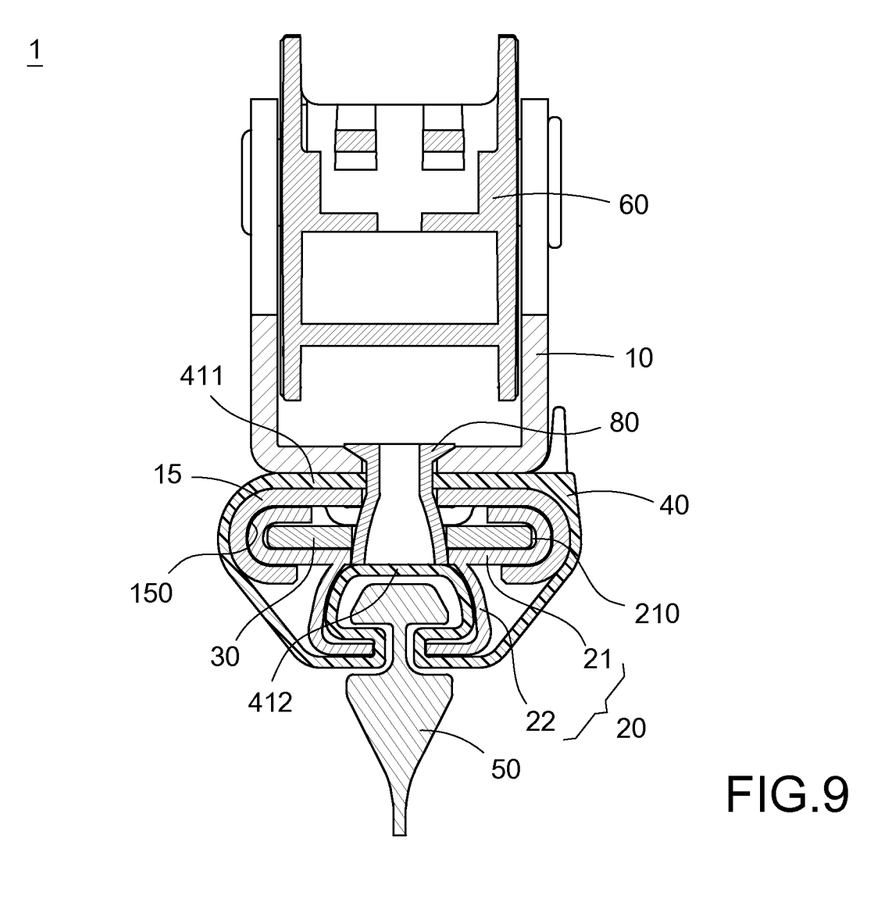
FIG. 9 is a cross-sectional view of the sealed type windshield wiper structure in this disclosure.

Please further refer to FIG. 9, which depicts a cross-sectional view of the sealed type windshield wiper structure. The sealed type windshield wiper structure 1 of this disclosure further includes a fastener 80. The fastener 80 passes through the hooking seat 10, the engaging seat 15, the top wall 411 of the waterproof cover 40, the elastic piece 30 and the carrying board 21 of the carrying seat 20 in sequence to combine the hooking seat 10, the engaging seat 15, the carrying seat 20, the elastic piece 30 and the waterproof cover 40.

While this disclosure has been described by means of specific embodiments, numerous modifications and variations could be made thereto by those skilled in the art without departing from the scope and spirit of this disclosure set forth in the claims.

What is claimed is:

1. A windshield wiper structure (1), comprising:
   a hooking seat (10);
   a carrying seat (20), combined on a bottom side of the hooking seat (10) and comprising a carrying board (21) and a carrying frame (22) connected with the carrying board (21), the carrying board (21) comprising a through slot (210), and the carrying frame (22) comprising an accommodating slot (220);
   an elastic piece (30), inserted in the through slot (210) and extended to two sides of the carrying seat (20);
   a waterproof cover (40), comprising a shell (41), an inner space (42) defined in the shell (41) and an outer space (43) defined outside the shell (41), wherein the carrying seat (20) is inserted in the inner space (42); and
   a rubber wiper (50), comprising a piercing strip (51) and a scraping strip (52) connected to the piercing strip (51), wherein the piercing strip (51) is inserted in the outer space (43), and the scraping strip (52) is exposed from the waterproof cover (40);
   wherein the shell (41) comprises (41) a top wall (411) attached to the hooking seat (10), an inner bottom wall (412) located opposite to the top wall (411) and attached to the carrying board (21), and two side walls (413) connected to the top wall (411) and the inner bottom wall (412), and a thickness of the top wall (411) is greater than a thickness of any one of the two side walls (413); and
   a fastener (80), passing through the hooking seat (10), the top wall (411), the elastic piece (30), and the carrying board (21) in sequence.

2. The windshield wiper structure (1) in claim 1, further comprising a holding seat (60), combined on the hooking seat (10), and covering the hooking seat (10) and supporting one end of a wiper driving arm (2).

3. The windshield wiper structure (1) in claim 1, further comprising an engaging seat (15), comprising a pair of through holes (150), wherein two sides of the carrying board (21) are respectively inserted in the through holes (150).

4. The windshield wiper structure (1) in claim 1, wherein the inner space (42) and the outer space (43) are respectively defined in a U-shape in cross-sectional view, and one side of the outer space (43) is an opening (44).

5. The windshield wiper structure (1) in claim 4, wherein the rubber wiper (50) further comprises a linking section (53) connected between the piercing strip (51) and the scraping strip (52), and the linking section (53) is erected in the opening (44).

* * * * *